United States Patent [19]
Auinger

[11] 3,979,618
[45] Sept. 7, 1976

[54] TWO LAYER WINDING FOR ELECTRIC MACHINES

[75] Inventor: Herbert Auinger, Nurnberg, Germany

[73] Assignee: Siemens Aktiengesellschaft, Munich, Germany

[22] Filed: Dec. 11, 1974

[21] Appl. No.: 531,697

Related U.S. Application Data

[63] Continuation of Ser. No. 356,298, May 2, 1973, abandoned.

[52] U.S. Cl. ............................................... 310/198
[51] Int. Cl.² ............................................ H02L 3/00
[58] Field of Search ........... 310/202, 203, 179, 180, 310/184, 198, 201, 204, 205, 206, 207, 208

[56] References Cited
UNITED STATES PATENTS

| | | | |
|---|---|---|---|
| 2,610,312 | 9/1952 | Seay | 310/184 |
| 3,201,627 | 8/1965 | Harrington | 310/206 |
| 3,335,307 | 8/1967 | Levy | 310/202 |
| 3,408,517 | 10/1968 | Willyoung | 310/202 |
| 3,601,642 | 8/1971 | Willyoung | 310/206 |
| 3,622,823 | 11/1971 | Broadway | 310/179 |
| 3,673,477 | 6/1972 | Broadway | 310/202 |
| 3,739,213 | 6/1973 | Willyoung | 310/206 |

*Primary Examiner*—R. Skudy
*Attorney, Agent, or Firm*—Kenyon & Kenyon Reilly Carr & Chapin

[57] ABSTRACT

A two layer cord winding for a three phase electric machine in which each of the three winding circuits comprise coils with a number of turns which fill a slot layer along with other coils which have a reduced number of turns and do not fill a whole slot layer. In slots wherein the coils with a reduced number of turns are located, the remaining space is filled by a coil with reduced turns from another of the three circuits of the three phase machine.

11 Claims, 20 Drawing Figures

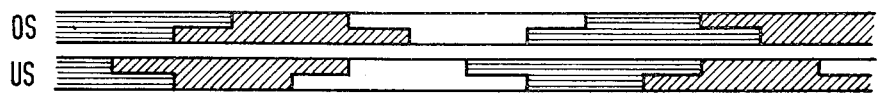
Fig. 2a
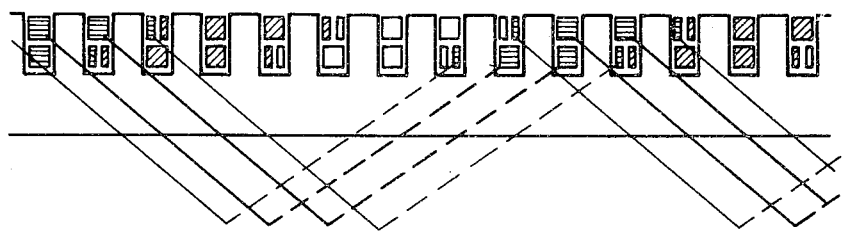
Fig. 2a'
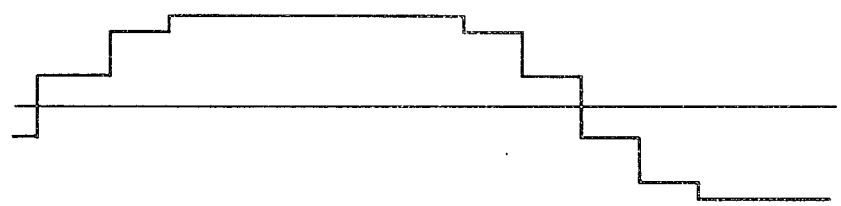
Fig. 2a"
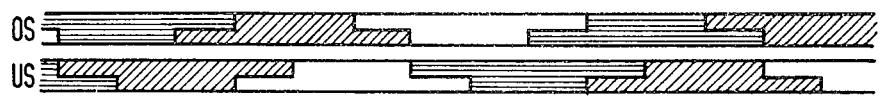
Fig. 2b
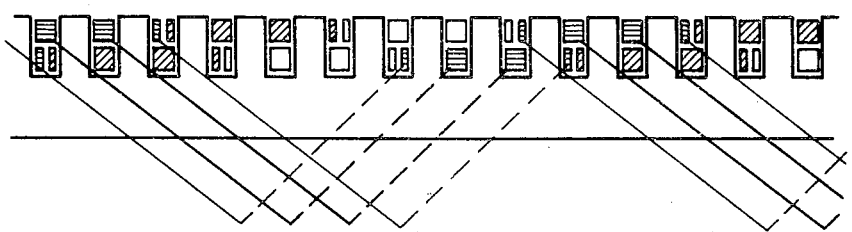
Fig. 2b'
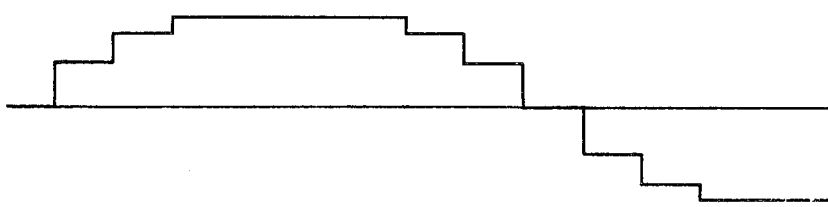
Fig. 2b"

Fig. 2c
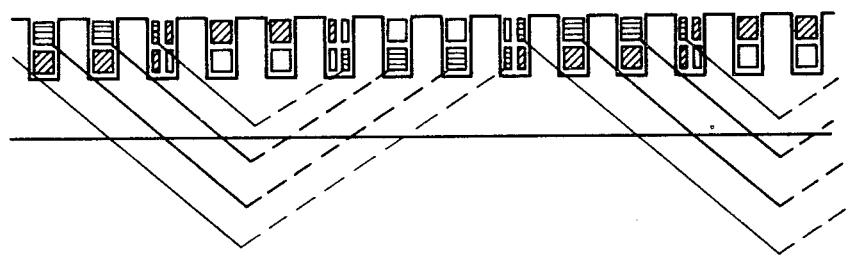
Fig. 2c'
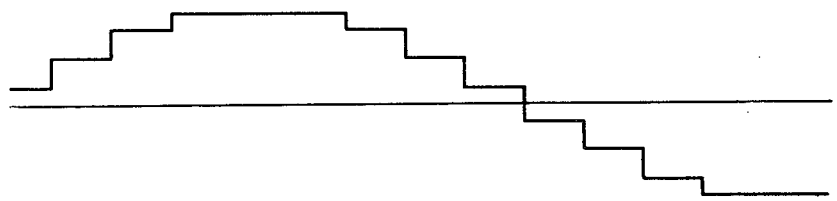
Fig. 2c"
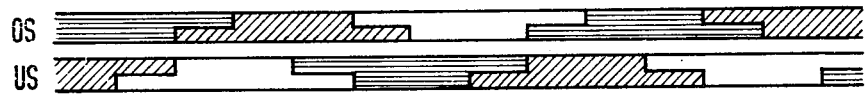
Fig. 2d
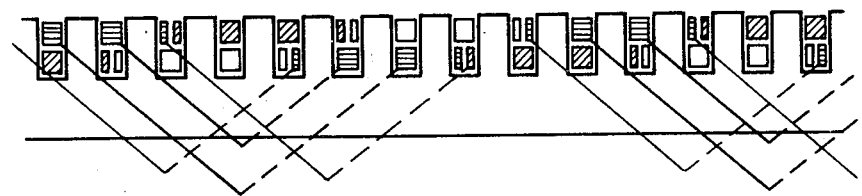
Fig. 2d'
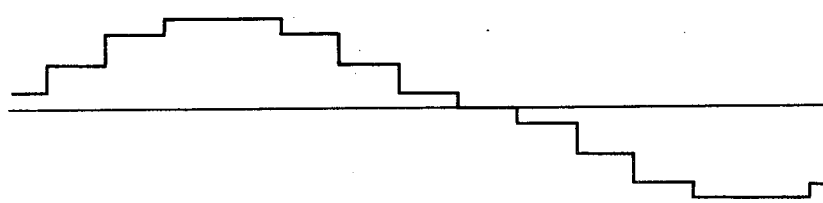
Fig. 2d"

3,979,618

TWO LAYER WINDING FOR ELECTRIC MACHINES

This is a continuation of application Ser. No. 356,298, filed May 2, 1973, now abandoned.

BACKGROUND OF THE INVENTION

This invention relates to electric machines in general and more particularly to an improved two layer cord winding for electric machines such as three phase synchronous generators, which winding produces an improved wave shape with less harmonics.

It is common practice in the winding of three phase electrical machines to use a three zone winding so that the phase voltages will contain no third harmonics. Such three zone windings, which may be of any cord pitch, can also be replaced, to advantage, with six zone, two-thirds pitch windings with unequal zone widths. This results in a reduced coil width and less coil end overhang. In turn, this reduces the amount of copper required and substantially reduces the stray fields at the coil ends. The three zone windings and the six zone windings are both equivalent as far as winding factors and field harmonics are concerned. However, both have the basic disadvantage that even harmonics may appear in the flux which can in turn lead to harmful wave voltages.

One manner of avoiding even harmonics is to use the above described arrangements in a four layer winding. However, this is more complicated to manufacture and requires more space for the slots and coil end insulation. Thus, there is need for a simplified two layer winding such as that described above which will eliminate even harmonics and which may be easily manufactured. In addition, such an arrangement should be possible with any coil width and number of slots and should not have detrimental effects on the other properties of the windings.

Summary of the Invention

The present invention solves this problem and eliminates even harmonics by using windings in each of the three phases or circuits which comprise both coils with a number of turns which fill one slot layer (full coils) and coils with a reduced number of turns (half coils). In the slots in which the half coils are placed, a half coil from another phase or circuit is also placed to fill the remainder of at least one slot layer. Thus, each of the slots will have therein, comprising its two layers, either two full coils of the same or different circuit, one full coil and two half coils belonging to different circuits, or four half coils of different circuits. One particularly useful embodiment in regard to eliminating harmonics comprises, for an even number of slots per pole and phase, a number of half coils which is twice the number of full coils used, and, for an odd number of slots per pole and circuit, a number of full coils which is one less than half the number of half coils. In general, the windings of the present invention will have approximately half of its coil windings in the form of half coils. The present invention offers the further advantage that the two layers of windings can be inserted into the slots in a single operation in the same manner as is presently done with conventional two layer windings.

As described above, in order to maintain a low harmonic content, two-thirds pitch, two layer cord windings are preferred. As noted above, this results in a smaller coil end portion. The present invention can provide such two layer windings comprising either coils which are all of equal coil width or of coils which are concentric for each circuit in the area of one pole pitch. As shown by the various illustrated embodiments, it is possible by changing the coil widths, or mean coil width in the case of concentric coils, and the overlap zone, i.e., the area of the half coils belonging to different circuits which are situated side by side in a slot, to obtain voltage and flux curves which are low in harmonics of a particular order (individual harmonics may be suppressed).

In comparison with the presently known low harmonic, two layer windings, the winding of the present invention provides no serious manufacturing problem. For example, see "Die Wicklungen elektrischer Maschinen" (The Windings of Electric Machines), vol. 1, by H. Sequenz, Springer Verlag, Vienna 1950, pp. 305–312 in which the conductors are graded in at least two steps and therefore have alternatingly different heights in the upper and lower layer precluding the use of coils of equal widths, an arrangement which results in manufacturing problems. Thus, the windings of the present invention offer the advantages of harmonic suppression without increasing the difficulty of manufacture.

BRIEF DESCRIPTION OF THE DRAWINGS

FIG. 1b is a two-thirds-pitch two-layer winding with coils of equal coil width for the same number of slots in FIG. 1a.

FIG. 2a is the zone plan for an eight-ninths-pitch two-layer winding.

FIG. 2a' is a two-layer winding according to the zone plan of FIG. 2a for an odd number of slots per pole and circuit with coils of equal width of a circuit.

FIG. 2a'' is the flux curve of one circuit of the winding as per FIG. 2a.

FIG. 2b is the zone plan for a seven-ninth-pitch two-layer winding.

FIG. 2b' is a two-layer winding according to the zone plan of FIG. 2b for an odd number of slots per pole and circuit with coils of equal width of one circuit.

FIG. 2b'' is the flux curve of one circuit according to FIG. 2b.

FIG. 2c is the zone plan for a two-layer winding with a mean two-thirds-pitch.

FIG. 2c' is a two-layer winding as per the zone plan of FIG. 2c for an odd number of slots per mole and circuit with concentric groups of coils of one circuit.

FIG. 2c'' is the flux curve of one circuit according to FIG. 2c.

FIG. 2d is the zone plan for a two-layer winding with a mean five-ninths-pitch.

FIG. 2d' is a two-layer winding according to the zone plan 2d for an odd number of slots per pole and circuit with two concentric full coils with two half coils of equal width of one circuit.

FIG. 2d'' is the flux curve of one circuit of the winding as per FIG. 2d.

FIG. 3b is the flux curve of one circuit of the winding according to FIG. 3a.

FIG. 3c is the zone plan of the winding according to FIG. 3a.

DETAILED DESCRIPTION OF THE PREFERRED EMBODIMENT

Figure 1C:
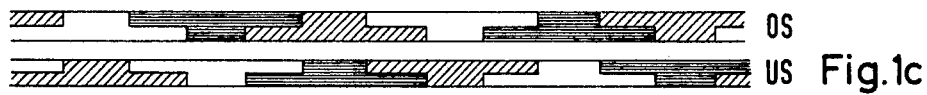
FIG. 1c is the corresponding zone plan for the windings according to FIGS. 1a and 1b.
Figure 1A:
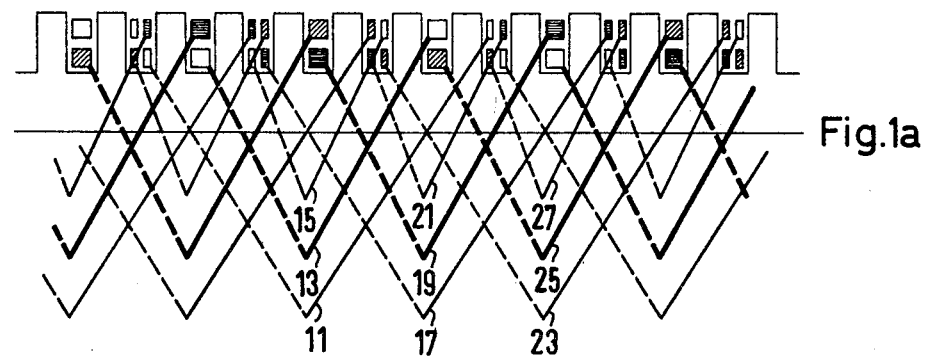
FIG. 1a is a two-thirds-pitch two-layer winding with concentric coils for an even number of slots per pole and circuit.

FIG. 1a illustrates a two thirds pitch, two layer winding for a twelve slot per pole pair (six slot per pole) machine having concentric coils. In the drawing, the coils for each phase or circuit are each given a separate code with the first phase being indicated by blank or white areas, the second phase by horizontal cross hatching and the third phase by diagonal cross hatching. The view of FIG. 1a is a cross sectional view through the slots with the one side of the coil loop shown by schematically by the alternately dashed and solid lines.

In the embodiment of FIG. 1a there are twice the number of half coils as full coils, with coils concentric for each pole and circuit. Thus, for the first phase there is a half coil 11 of a larger size, concentric therewith a smaller full coil 13, and a smaller still concentric half coil 15. Similarly for the second phase there is in a concentric arrangement a large coil 17, which is a half coil, a smaller full coil 19 and a half coil 21. For the third phase there is a large half coil 23, a smaller full coil 25 and a smaller still half coil 27. The pitch of the coils 11, 17, and 23 is 6, that of the coils 13, 19 and 25, 4 and that of the coils 15, 21 and 27, 2, resulting in a mean pitch of 4 which is two-thirds of the six slots per pole.

Figure 1B:
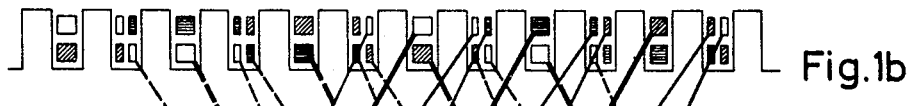
Figure 1D:
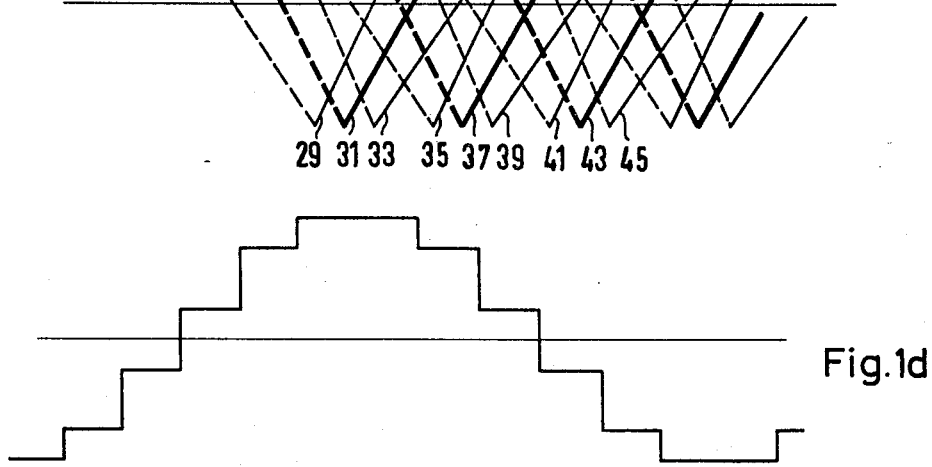
FIG. 1d is the flux curve for one circuit of the windings as per FIGS. 1a and 1b.

In the embodiment illustrated by FIG. 1b, wherein the same conventions are used as they will be throughout the specification, all coils are of equal size. Thus, the first phase has a half coil 29 a full coil 31 and another half coil 33. Similarly the second phase has a half coil 35 a full coil 37 and a half coil 39. The third phase has a half coil 41 a full coil 43 and a half coil 45. The pitch of each coil is 4 i.e. two-thirds of the full pitch of 6. Thus, in both cases a 6 zone, two layer winding with equally wide zones which overlap in the region of one slot is provided. In both embodiments slots with full two coils alternate with slots having four half coils. The zone plan for the arrangements of FIGS. 1a and 1b is shown on FIG. 1c which shows an upper layer OS and a lower layer US. The same cross-hatching conventions are used in FIGS. 1a and 1b are used herein. In the chosen convention of the zone plan of FIG. 1c and zone plans to be described below, the half coils are always shown with half bar height and the full coils with full bar height. The horizontal width is chosen according to the number of half or full coils respectively. The flux obtained by the windings of one phase of FIG. 1a or 1b is illustrated by FIG. 1d.

A winding such as that illustrated in FIGS. 1a and 1b can be manufactured in a simple manner similar to the manner of manufacturing an ordinary two-layer winding. In a manner of speaking, the winding is just like a conventional two-layer winding with one of the coils split into two half coils as described above. Its effect on the voltage and the layer shape and field harmonics are as shown on FIG. 1d and will be equivalent to a four layer winding consisting of two 5/6 pitches three zone windings on top of each other. In addition to obtaining advantageous reduction of harmonics, the coils will also have smaller coil ends due to the fact that the coil width is only two-thirds of the pole pitch. Although shown for a pole pitch of 6 slots, the same arrangement may be applied to poles having different numbers of slots.

FIGS. 2a through 2d illustrate the slot arrangements, zone plans and flux curves for two layer windings with 18 slots per pole pair, i.e. 9 slots per pole. In each case, an overlap of one slot is provided. This is, in the upper and lower layers two slots with full coils are followed by one slot with two half coils. The differences between the illustrated windings are in the coil width. FIG. 2a illustrated an 8/9 cord, FIG. 2b a 7/9th cord, FIG. 2c a ⅔ cord and FIG. 2d a 5/9ths cord. Of these, the ⅔ pitch coil arrangement of FIG. 2c, which has the same harmonic content as 2 conjugate 8/9's pitch three zones windings on top of each other is particularly useful. The various arrangements shown on the figures are self explanatory in view of the discussion of FIG. 1 and will not be further described herein.

Figure 3C:
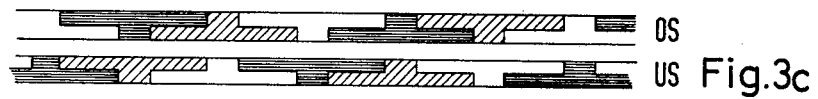
Figure 3B:
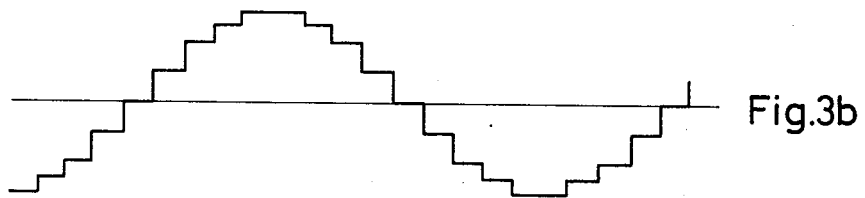
Figure 3A:
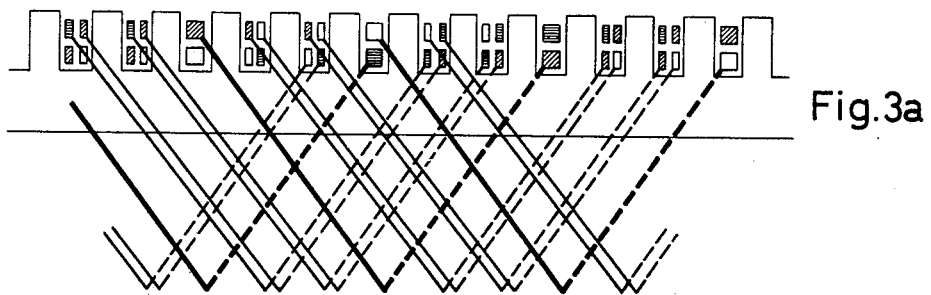
FIG. 3a is a two-layer winding with two-thirds-pitch for an odd number of slots per pole and circuit with coils of equal width.

In the arrangement of FIGS. 1 and 2 an overlap zone of 1 slot was provided in each case. It is also possible to use an overlap zone which is larger, for example 2 slots. Such an arrangement is particularly useful when it is desired to reduce odd harmonics. In such a case an overlap zone which is approximately half the number of slots per pole and circuit is most useful. FIG. 3 illustrates a ⅔ pitch 2 layer winding with 18 slots per pole pair and an overlap of 2 slots. Again, the same convention as were used in the previous figures are used herein and the arrangement is self explanatory from the drawings. Comparison of the zone plan of FIGS. 3c and the flux curve of FIG. 3b with the corresponding FIGS. 2c and 2c' where in the number of slots 2nd coil width is the same but where the overlap zone is half as wide will readily show the difference between these two arrangements. In effect the arrangement of FIG. 3 is the same as a 7/9 pitch three zone winding and will suppress even harmonics. It will be noted from an examination of FIG. 3a that the half coils of various branches very often lie directly next to one another at the coil end. This may necessitate additional insulation to separate the phases in the coil ends, particularly in high voltage machines.

Figure 4:
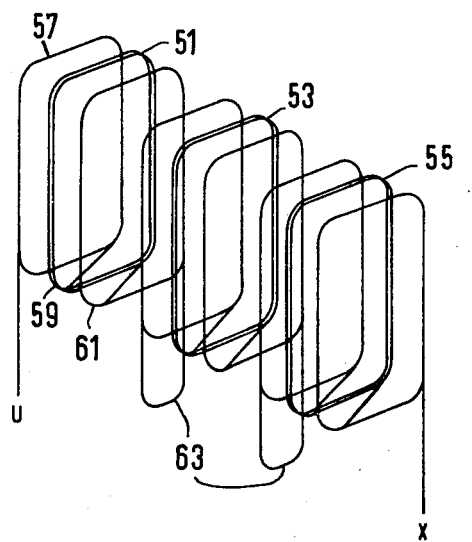
FIG. 4 illustrates coherently wound groups of coils without solder joints for one circuit.

FIG. 4 illustrates the manner in which all coil groups of an individual circuit can be continuously wound in a previously known manner (for example see German Auslegungsschrift No. 1,226,194). Using this winding method a continuous winding without solder joints and with all coils being wound in the same direction results. After winding, the individual coil groups can be inserted sequentially into the slots after they are flipped over by 180°. Thus, there are shown in general three groups of coils 51, 53 and 55 each comprising first a half coil 57, then a full coil 59 and finally another half coil 61. As shown, the interconnections 63 between the groups of coils are made sufficiently long to allow ease of insertion.

The two layer cord windings of the present invention are particularly well suited for machines which have a strict requirement on the shape of the voltage curve which they must provide, i.e., a wave which must be as sinusoidal as possible. This is frequently required in synchronous generators. However, the use of the two layer winding of the present invention, which is of simple design and easy to manufacture, is not limited to such synchronous machines, but may be used to advantage wherever even harmonics must be prevented in the flux curve and where in addition low harmonic phase voltages are desired.

Thus, an improved two layer winding for electric machines which results in a reduction of harmonics has been shown. Although a specific embodiment has been illustrated and described, it will be obvious to those skilled in the art that various modifications may be made without departing from the spirit of the invention which is intended to be limited solely by the appended claims.

What is claimed is:

1. A two layer cord winding for an electric machine having a plurality of slots for receiving windings, each of said slots being of the same depth, sized to accommodate two slot layers of full coils and being equally spaced, comprising, for each phase circuit in the machine, a first plurality of full coils having a number of turns which fills a slot layer and a second plurality of half coils with a reduced number of turns said first and second pluralities filling all slots in such a manner that each half coil placed in a slot layer having the rest of its volume occupied by a half coil of a different circuit.

2. The invention according to claim 1, wherein all coils have the same coil width.

3. The invention according to claim 2, wherein the coil width of all coils is two thirds of the pole pitch.

4. The invention according to claim 3, wherein the mean width of each concentric group of coils is two thirds of the pole pitch.

5. The invention according to claim 1, wherein all coils of a circuit lying in the area of one pole pitch form a concentric group.

6. The invention according to claim 1, wherein the two half coils are provided for each pole and circuit.

7. The invention according to claim 1, wherein all coils of each circuit are wound continuously in the same direction.

8. A two layer winding for an electric machine comprising, for each phase circuit in the machine having a plurality of poles, a first plurality of full coils having a number of turns which fill a slot layer, and a second plurality of half coils with a reduced number of turns and each half coil placed in a slot layer having the rest of its volume occupied by a half coil of a different circuit, and in both slot layers in each slot, slots having their two layers occupied by full coils of different circuits alternate with slots having their two layers occupied by four half coils of different circuits.

9. The invention according to claim 8, wherein each pole has an even number of slots and wherein twice as many half coils are provided as are full coils.

10. The invention according to claim 8, wherein an odd number of slots are provided per pole and wherein the number of full coils is one less than one half the number of half coils.

11. A two layer chord winding for an electric machine having a plurality of slots for receiving windings, each of said slots being of the same depth, sized to accommodate two slot layers of full coils and being equally spaced, comprising, for each phase circuit in the machine, a first plurality of full coils having a number of turns which fills a slot layer and a second plurality of half coils with a reduced number of turns, said first and second pluralities filling all slots in such a manner that each half coil is placed in a slot having the rest of its volumne occupied by a half coil of a different circuit and wherein the sides of coils of two different circuits of associated half coils within a slot layer are arranged overlapping one another in such a way that in both slot layers symmetrical windings zones are formed which have full coil sides in a middle portion with half coil sides on each end of said middle portion.

* * * * *